United States Patent [19]
Goto et al.

[11] Patent Number: 5,548,045
[45] Date of Patent: Aug. 20, 1996

[54] PROCESS FOR PRODUCING POLYBUTADIENE

[75] Inventors: Kohei Goto, Suzuka; Iwakazu Hattori, Aichi-ken; Shoji Ogasahara, Yokkaichi; Masahiro Shibata, Yokkaichi; Yoshiyuki Michino, Yokkaichi; Kazuo Soga, Tokyo; Takeshi Shiono, Yokohama, all of Japan

[73] Assignee: Japan Synthetic Rubber Co., Ltd., Tokyo, Japan

[21] Appl. No.: 302,958

[22] Filed: Sep. 12, 1994

Related U.S. Application Data

[63] Continuation of Ser. No. 873,234, Apr. 24, 1992, abandoned.

[30] Foreign Application Priority Data

Apr. 24, 1991 [JP] Japan ..................................... 3-119053

[51] Int. Cl.$^6$ ........................................................ C08F 4/70
[52] U.S. Cl. ............................ 526/161; 526/93; 585/507; 502/113; 502/126
[58] Field of Search ..................... 585/507, 509, 585/521, 523, 531; 526/92, 93, 185, 192, 193, 335, 161

[56] References Cited

U.S. PATENT DOCUMENTS

| | | | |
|---|---|---|---|
| 3,498,963 | 3/1970 | Ichikawa et al. | 526/128 |
| 3,522,332 | 7/1970 | Ichikawa et al. | 526/92 |
| 3,535,303 | 10/1970 | Ichikawa et al. | 526/139 |
| 3,901,868 | 8/1975 | Ueno et al. | 526/93 |
| 3,966,697 | 6/1976 | Kampf et al. | 526/93 |
| 4,048,418 | 9/1977 | Throckmorton | 526/138 |
| 4,153,767 | 5/1979 | Ueno et al. | 526/141 |
| 4,176,219 | 11/1979 | Makino et al. | 526/92 |
| 4,182,813 | 1/1980 | Makino et al. | 526/92 |
| 4,255,543 | 3/1981 | Makino et al. | 526/92 |
| 4,542,199 | 9/1985 | Kaminsky et al. . | |
| 4,954,125 | 9/1990 | Ono et al. | 526/138 |
| 5,122,584 | 6/1992 | Takahashi | 502/126 |
| 5,145,818 | 9/1992 | Tsutsui et al. | 502/113 |

FOREIGN PATENT DOCUMENTS

| | | |
|---|---|---|
| 0034235 | 8/1981 | European Pat. Off. . |
| 0106596 | 4/1984 | European Pat. Off. . |
| 0113309 | 7/1984 | European Pat. Off. . |
| 52-151382 | 12/1977 | Japan . |
| 52-152486 | 12/1977 | Japan . |
| 52-145490 | 12/1977 | Japan . |
| 2029427 | 3/1980 | United Kingdom . |

OTHER PUBLICATIONS

Journal of Polymer Science, Polymer Chemistry Edition, vol. 21, No. 7, pp. 1951–1972, Jul. 1983, H. Ashitaka, et al., "Syndiotactic 1,2–Polybutadiene with Co–CS$_2$ Catalyst System. II.* Catalysts for Stereospecifc Polynerization of Butadiene to Syndiotactic 1,2–Polybutadiene".

Polymer Communications, vol. 29, pp. 305–307, Oct. 1988, G. Ricci, et al., "Polymerization of Butadiene to 1,2–Syndiotactic Polymer with (n$^3$–C$_8$H$_{13}$)(C$_4$H$_6$)Co. Some Observations on the Factors that Determine the Stereospecificity".

Polymer Communications, vol. 32, No. 17, 1991, pp. 514–51, G. Ricci, et al., "Polymerization of Conjugated Dialkenes with Transition Metal Catalysts. Influence of Methylaluminoxane on Catalyst Activity and Stereospecificity".

*Primary Examiner*—Glenn A. Caldarola
*Attorney, Agent, or Firm*—Oblon, Spivak, McClelland, Maier & Neustadt, P.C.

[57] ABSTRACT

A process for producing a polybutadiene, which comprises polymerizing 1,3-butadiene in an inert organic solvent with a catalyst comprising (A) a cobalt compound, (B) an organoaluminum compound consisting essentially of an aluminoxane and, if necessary, (C) a tertiary phosphine compound, (D) at least one compound selected from the group consisting of an ester compound, an alcohol compound, a phenolic compound, a sulfoxide compound, a nitrogen-containing heterocyclic compound, water and a tertiary amine compound and (E) at least one compound selected from the group consisting of carbon disulfide, a xanthogen compound and a thioisocyanide. By this process, there can be produced, as desired, a cis-1,4-polybutadiene, a 1,2-polybutadiene having a desired vinyl content, a crystalline 1,2-polybutadiene or a polybutadiene containing crystalline 1,2-polybutadiene segments.

6 Claims, No Drawings

PROCESS FOR PRODUCING POLYBUTADIENE

This application is a Continuation of application Ser. No. 07/873,234, filed on Apr. 24, 1992, now abandoned.

BACKGROUND OF THE INVENTION

1. Field of the Invention

The present invention relates to a process for producing a polybutadiene. More particularly, the present invention relates to a process for producing a cis-1,4-polybutadiene, a 1,2-polybutadiene having a desired vinyl content, a crystalline 1,2-polybutadiene or a polybutadiene containing crystalline 1,2-polybutadiene segments.

2. Description of the Related Art

The structure of a butadiene polymer composed mainly of 1,3-butadiene depends largely upon the catalyst system used in the production of the polymer. For example, it is known that a cis-1,4- or trans-1,4-polybutadiene is obtained when a catalyst system consisting of a transition metal compound and an alkylaluminum is used. It is also known that a syndiotactic 1,2-polybutadiene is obtained when a catalyst system consisting of $CoBr_2(PPh_3)_2$, $Al(C_2H_5)_3$ and water is used (Japanese Patent Application Kokoku No. 44-32426).

Meanwhile, it is known that when a catalyst system consisting of BuLi or $Cr(acac)_3$—$Al(C_2H_5)_3$ is used, an atactic 1,2-polybutadiene or an isotactic 1,2-polybutadiene is obtained, respectively [A. F. Halasa et al., J. Polym. Sci. Polym. Chem. Ed., 19, 1357 (1981); G. Natta et al., Chem. Ind. (Millan), 41, 1163 (1959)].

With the above catalyst systems, however, it is impossible to produce a cis-1,4-polybutadiene, a 1,2 -polybutadiene having a desired vinyl content, a crystalline 1,2-polybutadiene and a polybutadiene containing crystalline 1,2-polybutadiene segments. That is, with the above catalyst systems, it is impossible to control the microstructure and stereoregurality over a wide range.

Further, the above catalyst systems have such problems that in producing a crystalline 1,2-polybutadiene, the catalyst activity is high in a halogenated hydrocarbon solvent but is low in a hydrocarbon solvent and the polymer obtained in a hydrocarbon solvent has a low melting point and a lower molecular weight than the practical level.

SUMMARY OF THE INVENTION

The present inventors have made extensive research for solving the above-mentioned problems of the prior art and, as a result, found that when a catalyst system containing both transition metal compound and organoaluminum compound is used, a cis-1,4-polybutadiene, a 1,2-polybutadiene having a desired vinyl content, a crystalline 1,2-polybutadiene and a polybutadiene containing crystalline 1,2-polybutadiene segments can be produced, and a crystalline 1,2-polybutadiene having a high and desirably controlled melting point and a highly controlled molecular weight in a practical level can be produced at a high catalyst activity even in a hydrocarbon solvent and that butadiene polymers having various microstructures and stereoregularities can be produced as desired by the appropriate selection of an electron donor compound which is one of the catalyst components.

DESCRIPTION OF THE PREFERRED EMBODIMENTS

According to the present invention, there is provided a process for producing a polybutadiene, which comprises polymerizing 1,3-butadiene in the presence of a catalyst comprising (A) a cobalt compound and (B) an organoaluminum compound consisting essentially of an aluminoxane in an inert organic solvent.

In the present invention, there can be used, as the cobalt compound (A), cobalt compounds having an apparent 0-valence to the maximum valence. The cobalt compound (A) is, for example, a cobalt salt of an inorganic acid, a cobalt salt of an organic acid, a cobalt complex consisting of one of these salts and an electron donor as a ligand. The cobalt salts are typically cobalt halides, cobalt sulfate, cobalt nitrate, cobalt carbonate, cobalt phosphate, cobalt sulfide, cobalt hydroxide, cobalt cyanide, cobalt thiocyanide, cobalt naphthenate and cobalt salts of organic acids (e.g. cobalt octanoate, cobalt stearate, cobalt benzoate and the like). The electron donor as a ligand for forming the complex includes phosphine compounds; phosphite compounds; pyridine; amines; dipyridyl compounds; phenanthroline; carbonyl; isonitrile; olefins; cyclodiene compounds such as 1,5-cyclooctadiene and cyclopentadiene; vinyl compounds; cyclopentadienyl compounds; π-allyl compounds; 1,3-diketones such as acetylacetone and acetoacetic acid; etc.

Of these cobalt compounds (A), preferable are cobalt complexes having organic phosphine compounds as ligands, for example, cobalt-phosphine complexes such as cobalt bis(triphenylphosphine) dibromide, cobalt bis(triphenylphosphine) dichloride, cobalt bis(tri-m-methylphenylphosphine) dibromide, cobalt bis(tri-m-methylphenylphosphine) dichloride, cobalt bis(tri-p-methylphenylphosphine) dibromide, cobalt bis(tri-p-methylphenylphosphine) dichloride, cobalt bis(tri-p-methoxyphenylphosphine) dibromide, cobalt bis(tri-p-methoxyphenylphosphine) dichloride, cobalt bis(dicyclohexylphenylphosphine) dibromide, cobalt bis(dicyclohexylphenylphosphine) dichloride, cobalt bis(tri-m-dimethylphenylphosphine) dibromide, cobalt bis(3,5-dimethyl-4-methoxyphenylphosphine) bromide, cobalt bis(3,5-dimethyl-4-methoxyphenylphosphine) chloride and the like.

Cobalt salts of organic acids having 4 or more carbon atoms are preferable in view of its solubility in organic solvents. The cobalt salts of organic acids include cobalt butanoate; cobalt hexanoate; cobalt heptanoate; cobalt salts of octanoic acids such as 2-ethylhexanoic acid and the like; cobalt decanoate; cobalt salts of higher fatty acids such as stearic acid, oleic acid, erucic acid and the like; cobalt benzoate; cobalt tolilate; cobalt salts of alkyl-, aralkyl- or aryl-substituted benzoic acids such as xylylic acid, ethylbenzoic acid and the like; cobalt naphthoate; and cobalt salts of alkyl-, aralkyl- or aryl-substituted naphthoic acids. Of these, cobalt 2-ethylhexanoate (so-called cobalt octanoate), cobalt stearate and cobalt benzoate are particularly preferable because of their excellent solubilities in organic solvents.

Specifically, there are preferred cobalt octanoate; cobalt naphthenate; cobalt salts of fatty acids, such as cobalt stearate, cobalt oleate and the like; and cobalt complexes having a 1,3-diketone such as acetylacetone or acetoacetic acid as a ligand.

The aluminoxane which is an essential component of the organoaluminum which is the component (B) of the present catalyst includes, for example, organoaluminum compounds represented by general formula (I) and (II):

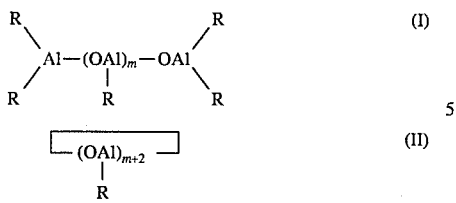

$$(II)$$

wherein R's represent the same hydrocarbon groups and m represents an integer of 2 or more. In the aluminoxane represented by general formula (I) or (II), R is a hydrocarbon group such as methyl, ethyl, propyl, butyl or the like, preferably methyl or ethyl, particularly preferably methyl; and m is an integer of 2 or more, preferably 5 or more, more preferably 10–100.

Specific examples of the aluminoxane include methylaluminoxane, ethylaluminoxane, propylaluminoxane, butylaluminoxane and the like.

Other aluminum compounds may optionally be contained in combination with the aluminoxane. Said other aluminum compounds include alkylaluminums, halogenated alkylaluminum compounds and alkylaluminum alkoxides.

The alkylaluminums include trimethylaluminum, triethylaluminum, triisobutylaluminum and trihexylaluminum.

The halogenated aluminum compounds include compounds represented by the general formula $AlR_m^1X_{3-m}$ wherein $R^1$ is an alkyl group; X is a halogen and m is 0, 1, 1.5 or 2. The alkyl group includes straight or branched alkyl groups having 1 to 8 carbon atoms such as methyl, ethyl, propyl, n-butyl, isobutyl, hexyl, octyl and the like. The halogen for X includes fluorine, chlorine, bromine and iodine, and chlorine is particularly preferable. The halogenated alkylaluminum compound is preferably diethylaluminum fluoride, diethylaluminum chloride, diethylaluminum bromide, diethylaluminum iodide, diisobutylaluminum fluoride, diisobutylaluminum chloride, diisobutylaluminum bromide, diisobutylaluminum iodide, dihexylaluminum fluoride, dihexylaluminum chloride, dihexylaluminum bromide, dihexylaluminum iodide, dioctylaluminum fluoride, dioctylaluminum chloride, dioctylaluminum bromide, dioctylaluminum iodide, ethylaluminum difluoride, ethylaluminum dichloride, ethylaluminum dibromide, ethylaluminum diiodide, isobutylaluminum dichloride, methylaluminum sesquichloride, ethylaluminum sesquichloride, aluminum trichloride, aluminum tribromide or aluminum triiodide.

The alkylaluminum alkoxides include alkoxy derivatives of organoaluminum compounds represented by the general formula $AlR_n^2(OR^3)_{3-n}$ wherein $R^2$ and $R^3$, which may be the same or different, represent alkyl groups and n represents 1 or 2. The alkyl group includes straight or branched alkyl groups having 1 to 8 carbon atoms such as methyl, ethyl, n-butyl, isobutyl, hexyl, octyl and the like. Preferable specific examples of the alkylaluminum alkoxide include diethylaluminum monomethoxide, diethylaluminum monoethoxide, diethylaluminum monobutoxide, diisobutylaluminum monomethoxide, diisobutylaluminum monobutoxide, ethylaluminum dimethoxide, ethylaluminum diethoxide, ethylaluminum dibutoxide, isobutylaluminum dimethoxide, isobutylaluminum diethoxide and isobutylaluminum dibutoxide.

Of the above aluminum compounds, trimethylaluminum, diethylaluminum chloride, ethylaluminum sesquichloride, ethylaluminum dichloride, diethylaluminum monomethoxide, diethylaluminum monoethoxide, ethylaluminum monomethoxide and ethylaluminum diethoxide are preferred because when they are used in combination with the aluminoxane a high catalyst activity is maintained.

The proportion of the aluminoxane to the aluminum compound used is 100/0 to 30/70 in terms of aluminum atomic ratio.

The above-mentioned aluminum compounds may be used alone or in admixture of two or more in combination with the aluminoxane.

A tertiary phosphine compound (component (C)) can be used in combination with the components (A) and (B) in order to control the 1,2-configuration of the microstructure of the polybutadiene and stereoregularity of the 1,2-configuration of the polybutadiene obtained in the present invention.

The tertiary phosphine compound includes aromatic phosphines such as tri(3-methylphenyl)phosphine, tri(3-ethylphenyl)phosphine, tri(4-methylphenyl)phosphine, tri(3,5-dimethylphenyl)phosphine, tri(3,4-dimethylphenyl)phosphine, tri(3-isopropylphenyl)phosphine, tri(3-tert-butylphenyl)phosphine, tri(3,5-diethylphenyl)phosphine, tri(3-methyl-5-ethylphenyl)phosphine, tri(3-phenylphenyl)phosphine, tri(3,4,5-trimethylphenyl)phosphine, tri(4-methoxy-3,5-dimethylphenyl)phosphine, tri(4-ethoxy-3,5-diethylphenyl)phosphine, tri(4-butoxy-3,5-dibutylphenyl)phosphine, tri(4-methoxyphenyl)phosphine, tricyclohexylphosphine, dicyclohexylphenylphosphine, dicyclohexylbenzylphosphine, tribenzylphosphine, tri(4-methylphenyl)phosphine, 1,2-diphenylphosphinoethane, 1,3-diphenylphosphinopropane, 1,4-diphenylphosphinobutane, tri(4-ethylphenyl)phosphine and the like, and aliphatic phosphines such as triethylphosphine, tributylphosphine and the like. Of these, particularly preferable are triphenylphosphine, tri(3-methylphenyl)phosphine, tri(4-methoxy-3,5-dimethylphenyl)phosphine, tri(4-methoxyphenyl)phosphine, tri(dicyclohexylphenyl)phosphine, tricyclohexylphosphine, tribenzylphosphine, tributylphosphine, dicyclohexylbenzylphosphine and tri(4-methylphenyl)phosphine.

As a catalyst activator, there can be used (D) at least one compound selected from the group consisting of an ester compound, an alcohol compound, a phenolic compound, a sulfoxide compound, a nitrogen-containing heterocyclic compound and a tertiary amine compound. Specific examples of the ester compound include methyl acetate, ethyl acetate, propyl acetate, butyl acetate, methyl propionate, ethyl propionate, propyl propionate, butyl propionate, diethyl carbonate, ethylene carbonate, dimethyl oxalate, diethyl oxalate, dipropyl oxalate, dibutyl oxalate, dimethyl malonate, diethyl malonate, dipropyl malonate, dibutyl malonate, dimethyl succinate, diethyl succinate, dipropyl succinate, dibutyl succinate, dimethyl fumarate, diethyl fumarate, dipropyl fumarate, dibutyl fumarate, dimethyl maleate, diethyl maleate, dipropyl maleate, dibutyl maleate, methyl benzoate, ethyl benzoate, propyl benzoate, butyl benzoate, methyl toluate, ethyl toluate, propyl toluate, butyl toluate, methyl naphthoate, ethyl naphthoate, propyl naphthoate, butyl naphthoate, dimethyl phthalate, diethyl phthalate, dipropyl phthalate, dibutyl phthalate, methyl lactate, ethyl lactate, propyl lactate, butyl lactate, methyl oleate, methyl stearate, etc. Specific examples of the alcohol compound include methanol, ethanol, propanol, butanol, pentanol, hexanol, cyclopentanol, cyclohexanol, ethylene glycol, propylene glycol, butanediol, glycerine, pentaerythritol, etc. Specific examples of the phenolic compound include phenol; alkyl-substituted phenols such as methylphenol, ethylphenol, propylphenol, butylphenol and the like; halogen-substituted phenols such as chlorophenol, bromophenol, fluorophenol and the like; and hindered phenols such as 2,6-di-tert-butyl-p-cresol, 2,5-di-tert-amylhydroquinone, 2,5-ditert-butylhydroquinone, 4,4'-dihydroxydiphenylcyclohexane, 2,2'-methylenebis(4-methyl-6-tert-butylphenol), 4,4'-thiobis(6-tert-butyl-3-methylphenol), 2,2'-dihydroxy-3,3'-di-α-methylcyclohexyl), 5,5'-dimethyldiphenylmethane, pentaerythritol tetrakis[3-(3, 5-di-tert-butyl-4-hydroxyphenyl)propionate], 2,2'-thiodiethylbis-3-(3,5-di-tert-butyl- 4-hydroxyphenyl) propionate, 2-tert-butyl-4-( 3-tert-butyl-2-hydroxy-5-methylbenzyl)-4-methylphenyl acrylate, 2,2'-methylenebis(6-α-methylbenzyl-p-cresol) and the like. Specific examples of the sulfoxide compound include dimethyl sulfoxide, diethyl sulfoxide, etc. Specific examples of the nitrogen-containing heterocyclic compound include pyridine, 2-picoline, 2,6 -lutidine, quinoline, isoquinoline, etc. Specific examples of the tertiary amine compound include trimethylamine, triethylamine, tripropylamine, tributylamine, etc. Water can also be used as an activator.

As an additive for controlling the 1,2 configuration of the microstructure of the polybutadiene obtained in the present invention and also for increasing the crystallinity of the polymer, there can be used (E) at least one compound selected from the group consisting of carbon disulfide, a xanthogen compound and a thioisocyanide compound. Specific examples of the thioisocyanide compound include phenyl thioisocyanide, tolyl thioisocyanide, etc. Specific examples of the xanthogen compound include diethylxanthogen sulfide, dimethylxanthogen sulfide, phenylxanthogen sulfide, tolylxanthogen sulfide, etc.

In the present invention, the cobalt compound [the catalyst component (A)] is used in an amount of about 0.001–1 millimole, preferably about 0.01–0.5 millimole in terms of cobalt atom, per mole of 1,3-butadiene.

The organoaluminum compound [the catalyst component (B)] is used as to give an Al/Co atomic ratio [a ratio of aluminum atoms in component (B) to cobalt atoms in component (A)] of preferably $4-10^7$, more preferably $10-10^6$.

The amount of the component (C) used in the catalyst is 0.01–10 moles per mole of the cobalt compound (A). When the amount is smaller than 0.01 mole the vinyl content-increasing effect is small and when the amount is larger than 10 moles the polymerization activity is greatly reduced.

The amount of the component (D) used in the catalyst is 0.05–10 moles per mole of the cobalt compound (A). When the amount is smaller than 0.05 mole no polymerization activity-increasing effect is obtained and when the amount is larger than 10 moles the polymerization activity is rather reduced.

The amount of the component (E) used in the catalyst is 0.05–10 moles per mole of the cobalt compound (A). When the amount is smaller than 0.05 mole no crystallinity-increasing effect is obtained, and when the amount is larger than 10 moles the effect reaches substantial saturation or the polymerization activity is greatly decreased.

The catalyst used in the present invention is prepared by adding individual components in any desired order and mixing them preferably in a hydrocarbon or halogenated hydrocarbon solvent. The preparation may be effected before the catalyst contacts with 1,3-butadiene, or may be effected by mixing the components in the presence of 1,3-butadiene in a polymerization reactor.

In the present invention, 1,3-butadiene is polymerized in an inert organic solvent in the presence of the catalyst components (A) and (B); (A), (B) and (C); (A), (B) and (D); (A), (B) and (E); (A), (B), (C) and (D); or (A), (B), (D) and (E).

The polymerization solvent is an inert organic solvent and includes aromatic hydrocarbon solvents such as benzene, toluene, xylene, cumene and the like; aliphatic hydrocarbon solvents such as pentane, hexane, butane and the like; alicyclic hydrocarbon solvents such as methylcyclopentane, cyclohexane and the like; halogenated hydrocarbon solvents such as methylene chloride, chloroform, carbon tetrachloride, 1,2-dichloroethane, trichloroethylene, perchloroethylene, chlorobenzene, bromobenzene, chlorotoluene and the like; and mixtures thereof.

In the present process, it is also possible to produce a polybutadiene by slurry polymerization using an aliphatic hydrocarbon as the polymerization solvent. Also, there may be used polymerization of a $C_4$ fraction freed from polymerization-inhibiting components such as 1,2-butadiene, acetylene and the like, and bulk polymerization of butadiene at a low conversion at a controlled polymerization rate.

The polymerization temperature is preferably –50° C. to 120° C., more preferably –20° C. to 50° C. The polymerization reaction may be batchwise or continuous.

The monomer concentration in solvent is preferably 5–50% by weight, more preferably 10–35% by weight.

In producing a polymer according to the present invention, in order to prevent the deactivation of the catalyst used and the polymer formed, measures must be taken to avoid or minimize the incorporation of deactivating compounds such as oxygen, water, carbon dioxide and the like into the polymerization system.

Hydrogen may be used as a molecular weight-modifier to control the molecular weight of the polymer obtained.

When the polymerization reaction has reached a desired stage, there are added to the reaction mixture an alcohol or other polymerization terminator, an age resister, an antioxidant, an ultraviolet absorber, etc. Then, the polymer formed is separated, washed and dried according to usual methods to obtain a desired polybutadiene.

According to the present process, since a specific catalyst is used, the vinyl content in the polybutadiene obtained can be easily controlled over a wide range by, for example, controlling the polymerization temperature. For example, when two polybutadienes are produced under the same specific conditions but at different polymerization temperatures of 20° C. and 40° C., the vinyl contents of these polybutadienes differ by about 30%.

Thus, in the polybutadiene obtained with a catalyst comprising the components (A) and (B) as the essential components, the vinyl content of butadiene portion is in the range of 5–90% and the cis-1,4 content is in the range of 10–95%.

In the polybutadiene obtained with a catalyst comprising the components (A), (B) and (C) as the essential components, the vinyl content of butadiene portion is in the range of 10–99% and the cis-1,4 content is in the range of 1–90%. Hence, the vinyl content can be increased easily.

In the present process, the use of a catalyst system consisting of a cobalt salt of an organic acid or a cobalt complex compound having a 1,3-diketone as a ligand [as the cobalt compound (A)] and the component (B) enables production of a cis-1,4-polybutadiene. When a cobalt-phosphine complex compound is used as the cobalt compound (A), there can be obtained a polybutadiene in which a cis-1,4 configuration and a 1,2 configuration coexist or a 1,2 configuration is present in a large proportion.

When the component (D) is added to the above catalyst systems, the polymerization activity of each of the catalyst systems can be increased.

When a cobalt salt of an organic acid or a cobalt complex compound having a 1,3-diketone as a ligand is used as the cobalt compound (A), the organoaluminum compound is used as the component (B) and the tertiary phosphine compound is used as the component (C), there can be obtained a crystalline or amorphous 1,2-polybutadiene having a vinyl content of 70% or more and a melting point of 40°–150° C., preferably 50°–150° C. When the component (C) is replaced by the component (E), i.e. at least one compound selected from the group consisting of carbon disulfide, a xanthogen compound and a thioisocyanide compound, there can be obtained a crystalline 1,2-polybutadiene having a vinyl content of 80% or more, namely a high syndiotacticity.

When the component (D) is added to the above catalyst systems, i.e. (A)+(B), (A)+(B)+(C) and (A)+(B)+(E), the polymerization activity of each of the catalyst systems can be increased.

When in the first stage, 1,3-butadiene is polymerized in an inert organic solvent in the presence of a catalyst system consisting of (A) a cobalt salt of an organic acid or a cobalt complex compound having a 1,3-diketone as a ligand and (B) an organoaluminum compound consisting essentially of an aluminoxane and, in the second stage, (C) a tertiary phosphine compound or (E) at least one compound selected from the group consisting of carbon disulfide, a xanthogen compound and a thioisocyanide compound is added and the reaction is continued, there can be obtained a cis-1,4-polybutadiene containing a crystalline 1,2-polybutadiene segment. In this case, when the component (D) is used together in the first stage and/or the second stage, the polymerization activity can be increased.

In the polybutadiene obtained in the present invention, the molecular weight can be varied over a wide range but the polystyrene-reduced number-average molecular weight is preferably 5,000–1,000,000, more preferably 10,000–800,000. When the molecular weight is less than 5,000, the polymer has insufficient strength. On the other hand, when the molecular weight is more than 1,000,000, the polymer has inferior processability; consequently, a large torque is required during kneading on rolls or in a Banburymixer and dispersion of compounding chemicals or reinforcing agents (e.g. carbon black) becomes unsatisfactor, and the properties of the vulcanizate become inferior.

The Mooney viscosity ($ML_{1+4}$, 100° C.) of the polybutadiene obtained in the present invention is preferably 20–150, more preferably 30–80 when it is used as rubber products for industrial applications, in particular. When the Mooney viscosity is less than 20, the physical properties of vulcanizate are inferior for the same reasons as mentioned above. On the other hand, when the viscosity is more than 150, the polymer has inferior processability.

Further, the ratio of weight-average molecular weight ($\overline{Mw}$) to the polystyrene-reduced number-average molecular weight ($\overline{Mn}$), i.e. the molecular weight distribution ($\overline{Mw}/\overline{Mn}$) of the polybutadiene obtained in the present invention can be varied over a wide range; however, it is usually 1.5–5.0. It is difficult technically to obtain a molecular weight distribution of less than 1.5. When the molecular weight distribution is larger than 5.0 the physical properties are inferior and the amount of a low molecular weight polymer is increased.

The polybutadiene obtained in the present invention is used as a material rubber alone or in admixture with other synthetic rubbers or natural rubber. It necessary, it can be extended with a process oil and then mixed with conventional compounding agents for vulcanized rubbers, such as filler (e.g. carbon black), vulcanizing agent, vulcanization accelerator and the like to obtain a rubber composition. The composition is vulcanized, and the vulcanizate thus obtained can be used in rubber applications where mechanical properties and abrasion resistance are required, for example, tire, hose, belt and other industrial rubber products.

The present invention is more specifically described below with reference to Examples. However, the present invention is by no means restricted to these Examples.

In the Examples, parts and % are by weight unless otherwise specified.

In the Examples, measurements of properties were made in accordance with the following methods.

The vinyl content of polybutadiene was measured by an infrared absorption spectrum method (Morero method).

The melting point of polybutadiene was measured using a DSC (differential scanning calorimeter), in accordance with ASTM D 3418.

Weight-average molecular weight and number-average molecular weight were measured by gel permeation chromatography [C-4A of Shimadzu Corporation], at 40° C. using a tetrahydrofuran as a solvent.

Glass transition temperature and melting point were measured using a DSC [SSC5200H manufactured by Seiko Instruments Inc.], in accordance with ASTM D 3418.

REFERENCE EXAMPLE

Preparation of 1,3-Butadiene, Catalysts and Polymerization Solvent 1,3-butadiene 1,3-Butadiene manufactured by Japan Synthetic Rubber Co., Ltd. was subjected to distillation and then dried with a Molecular Sieve 4A.

Cobalt bis(triphenylphosphine) dibromide

A dichloromethane solution of cobalt bis(triphenylphosphine) dibromide synthesized by a method described in J. Chatt et al., J. Chem. Soc., 1961, 285

Methylaluminoxane

A toluene solution of methylaluminoxane manufactured by TOSOH AKZO CORPORATION

Triisobutylaluminum

A toluene solution of triisobutylaluminum manufactured by TOSOH AKZO CORPORATION

Triisobutylaluminoxane

A n-hexane solution of triisobutylaluminoxane manufactured by TOSOH AKZO CORPORATION

Polymerization solvent

Degassed using dry nitrogen and then dried with Molecular Sieve 4A.

EXAMPLES 1–3

In a 100-ml stainless steel autoclave containing a rotor were placed methylaluminoxane and cobalt bis(triphenylphosphine) dibromide together with 60 g of toluene as a solvent and 10 g of 1,3-butadiene in a dry nitrogen atmosphere so that the molar ratio of 1,3-butadiene/Co and the atomic ratio of Al/Co became $1\times10^4$ and $1\times10^3$, respectively. Then, polymerization of 1,3-butadiene was conducted at 20° C. for a varying period of time as shown in Table 1. After the completion of the polymerization, a hydrochloric acid-methanol solution was added to the polymerization mixture to terminate the polymerization, after which the polybutadiene formed was separated by filtration and vacuum-dried at 60° C. The results of measurement are shown in Table 1.

As is clear from Table 1, when the polymerization temperature is constant, the molecular weight and vinyl content of the polybutadiene obtained are each substantially constant, even when the conversion is varied by varying the polymerization time.

EXAMPLE 4

The same procedure as in Example 1 was repeated, except that the polymerization temperature was changed to 0° C. and the polymerization time was changed to 8 hours. The results of measurement are shown in Table 2.

EXAMPLES 5–8

The same procedure as in Example 1 was repeated, except that methylaluminoxane and cobalt bis(triphenylphosphine) dibromide were added so as to give an Al/Co atomic ratio of $2.5\times10^4$ and the polymerization temperature was changed as shown in Table 2.

As is clear from Table 2, when the polymerization temperature is varied, the vinyl content is high when the polymerization temperature is low, but becomes lower as the polymerization temperature gets higher. Thus, it can be seen that the vinyl content of the polybutadiene obtained can be easily controlled by varying the polymerization temperature.

TABLE 1

|  | Example 1 | Example 2 | Example 3 |
|---|---|---|---|
| Polymerization time (hr) | 1 | 2 | 4 |
| Conversion (%) | 13 | 23 | 39 |
| Number-average molecular weight ($\bar{M}n$) | $1.41\times10^5$ | $1.36\times10^5$ | $1.34\times10^5$ |
| Weight-average molecular weight ($\bar{M}w$) | $2.56\times10^5$ | $2.61\times10^5$ | $2.61\times10^5$ |
| $\bar{M}w/\bar{M}n$ | 1.82 | 1.91 | 1.94 |
| Vinyl content (%) | 65 | 66 | 67 |

TABLE 2

|  | Example | | | | |
|---|---|---|---|---|---|
|  | 4 | 5 | 6 | 7 | 8 |
| Polymerization temperature (°C.) | 0 | 20 | 30 | 40 | 80 |
| Conversion (%) | 24 | 12 | 13 | 9 | 14 |
| Number-average molecular weight ($\bar{M}n$) | $1.70\times10^5$ | $2.05\times10^5$ | $1.58\times10^5$ | $0.98\times10^5$ | $0.30\times10^5$ |
| Weight-average molecular weight ($\bar{M}w$) | $3.35\times10^5$ | $3.92\times10^5$ | $3.15\times10^5$ | $3.84\times10^5$ | $1.01\times10^5$ |
| $\bar{M}w/\bar{M}n$ | 1.97 | 1.91 | 2.00 | 3.91 | 3.41 |
| Vinyl content (%) | 61 | 63 | 60 | 28 | 11 |

EXAMPLE 9

In a 100-ml pressure bottle made of a hard glass were placed a methylaluminoxane solution in toluene and a cobalt octylate-triphenylphosphine-toluene mixture, together with 60 g of toluene and 10 g of 1,3-butadiene, in a dry nitrogen atmosphere so that the molar ratio of 1,3-butadiene/cobalt octylate (Co), and the atomic ratios of methylaluminoxane (Al)/cobalt octylate (Co) and triphenylphosphine (P)/cobalt octylate (Co) became 10,000, 50 and 2.5, respectively. The resulting mixture was subjected to polymerization at 10° C. for 10 minutes. The reaction was terminated by adding, to the polymerization system, a small amount of methanol containing 2,6-di-tert-butyl-p-cresol as a reaction terminator.

The resulting reaction mixture was poured into a large amount of methanol to coagulate a polymer. The polymer thus coagulated was vacuum-dried at 40° C. and the amount of the polymer was then measured to determine the yield.

The polymer was measured for 1,2-vinyl content (%), melting point (°C.), weight-average molecular weight ($\bar{M}w$), number-average molecular weight ($\bar{M}n$) and molecular weight distribution ($\bar{M}w/\bar{M}n$). The results are shown in Table 3.

EXAMPLES 10–13

Polybutadienes were obtained by repeating the same procedure as in Example 9, except that the polymerization solvent (toluene) used in Example 9 was replaced by n-hexane, cyclohexane, methylene chloride or 1,2-dichloroethane. The results of measurement are shown in Table 3.

EXAMPLES 14–16

Polybutadienes were obtained by repeating the same procedure as in Example 9, except that the phosphine compound (C) (triphenylphosphine) used in Example 9 was replaced by tris(2-methylphenyl)phosphine, tris(3-methylphenyl)phosphine or tris(2,4-dimethylphenyl)phosphine. The results of measurement are shown in Table 3.

EXAMPLE 17

A polybutadiene was obtained by repeating the same procedure as in Example 9, except that the cobalt octylate as the component (A) used in Example 9 was replaced by cobalt stearate. The results of measurement are shown in Table 3.

EXAMPLES 18–21

Polybutadienes were obtained by repeating the same procedure as in Example 9, except that the polymerization conditions used in Example 9 were changed to those shown in Table 3. The results of measurement are shown in Table 3.

EXAMPLE 22

The same procedure as in Example 9 was repeated, except that, in the catalyst components used in Example 9, the triphenylphosphine was not used, to obtain a polybutadiene having a cis-1,4 content of 92% and a vinyl content of 8%.

COMPARATIVE EXAMPLE 1

The same procedure as in Example 9 was repeated, except that the polymerization solvent used in Example 9 was replaced by methylene chloride and water, triisobutylaluminum and bis(triphenylphosphine)cobalt dibromide were added in place of the catalyst components in Example 9 so that BD (butadiene)/Co=10,000 (molar ratio), Al/Co=50 (atomic ratio) and $H_2O$/Al=0.8 (molar ratio). The results of measurement are shown in Table 3.

COMPARATIVE EXAMPLE 2

The same procedure as in Comparative Example 1 was repeated, except that the polymerization solvent was replaced by toluene. The results of measurement are shown in Table 3.

COMPARATIVE EXAMPLES 3–6

The same procedure as in Example 9 was repeated, except that the methylaluminoxane used as the component (B) in Example 9 was replaced by triisobutylaluminum, water+triisobutylaluminum (water/aluminum molar ratio=0.8), triethylaluminum, or water+triethylaluminum (water/aluminum molar ratio=0.8). The results of measurement are shown in Table 3.

TABLE 3

| | Component (A) | Component (B) | Component (C) | BD/Co (molar ratio) | Al/Co (atomic ratio) | P/Co (atomic ratio) | Polymerization solvent | Polymerization temp. (°C.) | Polymerization time (min.) | Polymer yield (%) |
|---|---|---|---|---|---|---|---|---|---|---|
| Example 9 | Cobalt octanoate | Methylaluminoxane | Triphenylphosphine | 10,000 | 50 | 2.5 | Toluene | 10 | 30 | 95 |
| Example 10 | Cobalt octanoate | Methylaluminoxane | Triphenylphosphine | 10,000 | 50 | 2.5 | Cyclohexane | 10 | 30 | 94 |
| Example 11 | Cobalt octanoate | Methylaluminoxane | Triphenylphosphine | 10,000 | 50 | 2.5 | n-Hexane | 10 | 30 | 96 |
| Example 12 | Cobalt octanoate | Methylaluminoxane | Triphenylphosphine | 10,000 | 50 | 2.5 | Methylene chloride | 10 | 30 | 95 |
| Example 13 | Cobalt octanoate | Methylaluminoxane | Triphenylphosphine | 10,000 | 50 | 2.5 | 1,2-Dichloroethane | 10 | 30 | 97 |
| Example 14 | Cobalt octanoate | Methylaluminoxane | Tris(2-methylphenyl)phosphine | 10,000 | 50 | 2.5 | Toluene | 10 | 30 | 96 |
| Example 15 | Cobalt octanoate | Methylaluminoxane | Tris(3-methylphenyl)phosphine | 10.000 | 50 | 2.5 | " | 10 | 30 | 95 |
| Example 16 | Cobalt octanoate | Methylaluminoxane | Tris(2,4-dimethylphenyl)phosphine | 10,000 | 50 | 2.5 | " | 10 | 30 | 94 |
| Example 17 | Cobalt stearate | Methylaluminoxane | Triphenylphosphine | 10,000 | 50 | 2.5 | " | 10 | 30 | 95 |
| Example 18 | Cobalt octylate | Methylaluminoxane | Triphenylphosphine | 5,000 | 25 | 5 | " | 20 | 30 | 96 |
| Example 19 | Cobalt octanoate | Methylaluminoxane | Triphenylphosphine | 20,000 | 100 | 5 | Toluene | 20 | 30 | 92 |
| Example 20 | Cobalt octanoate | Methylaluminoxane | Triphenylphosphine | 40,000 | 500 | 5 | " | 20 | 30 | 89 |
| Example 21 | Cobalt octanoate | Methylaluminoxane | Triphenylphosphine | 10,000 | 100 | 5 | " | 0 | 30 | 94 |
| Example 22 | Cobalt octanoate | Methylaluminoxane | Triphenylphosphine | 10,000 | 50 | — | " | 10 | 30 | 37 |
| Comp. Ex. 1 | Bis(triphenylphosphine)cobalt dibromide [Co(PPh$_3$)$_2$Br$_2$]/triisobutylaluminum/water | | | 10,000 | 50 | — | Methylene chloride | 10 | 30 | 95 |
| Comp. Ex. 2 | Bis(triphenylphosphine)cobalt dibromide [Co(PPh$_3$)$_2$Br$_2$]/triisobutylaluminum/water | | | 10,000 | 50 | — | Toluene | 10 | 30 | 22 |
| Comp. Ex. 3 | Cobalt octanoate | Triisobutylaluminum | Triphenylphosphine | 10,000 | 50 | 5 | " | 10 | 30 | 0 |
| Comp. Ex. 4 | Cobalt octanoate | Water + triisobutyl- | Triphenylphosphine | 10,000 | 50 | 5 | " | 10 | 30 | 0 |

TABLE 3-continued

| | | aluminum | | | | | | | | |
|---|---|---|---|---|---|---|---|---|---|---|
| Comp. Ex. 5 | Cobalt octanoate | Triethyl- aluminum | Triphenyl- phosphine | 10,000 | 50 | 5 | " | 10 | 30 | 0 |
| Comp. Ex. 6 | Cobalt octanoate | Water + triethyl- aluminum | Triphenyl- phosphine | 10,000 | 50 | 5 | " | 10 | 30 | 0 |

| | Vinyl content (%) | Melting point (°C.) | $\bar{M}n \times 10^4$ | $\bar{M}w \times 10^4$ | $\bar{M}w/\bar{M}n$ |
|---|---|---|---|---|---|
| Example 9 | 92 | 75 | 12.5 | 35.6 | 2.85 |
| Example 10 | 93 | 84 | 15.3 | 41.9 | 2.74 |
| Example 11 | 93 | 98 | 13.3 | 31.1 | 2.34 |
| Example 12 | 89 | 72 | 14.6 | 42.6 | 2.92 |
| Example 13 | 89 | 68 | 13.8 | 39.2 | 2.84 |
| Example 14 | 94 | 84 | 19.8 | 57.8 | 2.92 |
| Example 15 | 92 | 77 | 16.3 | 46.3 | 2.84 |
| Example 16 | 96 | 92 | 12.4 | 33.9 | 2.73 |
| Example 17 | 92 | 74 | 11.2 | 29.7 | 2.65 |
| Example 18 | 92 | 73 | 7.2 | 20.0 | 2.78 |
| Example 19 | 92 | 77 | 19.3 | 51.1 | 2.65 |
| Example 20 | 92 | 79 | 22.3 | 50.6 | 2.27 |
| Example 21 | 92 | 80 | 13.4 | 29.2 | 2.18 |
| Example 22 | 8 | — | 1.21 | 2.76 | 2.28 |
| Comp. Ex. 1 | 90 | 78 | 5.48 | 11.71 | 2.10 |
| Comp. Ex. 2 | 88 | 64 | 1.14 | 2.71 | 2.38 |
| Comp. Ex. 3 | — | — | — | — | — |
| Comp. Ex. 4 | — | — | — | — | — |
| Comp. Ex. 5 | — | — | — | — | — |
| Comp. Ex. 6 | — | — | — | — | — |

EXAMPLES 23–25

In a 100-ml pressure bottle thoroughly purged with nitrogen were placed 54 ml of toluene and 9.2 μl of water. The bottle was stoppered. Thereto was added 10 g of 1,3-butadiene, and the bottle was shaken at 10° C. for 10 minutes. Then, there were added triisobutylaluminum [Al(i-Bu)₃], methylaluminoxane (MAO) and cobalt bis(triphenylphosphine) dibromide in a polymerization recipe as shown in Table 4. The resulting mixture was subjected to polymerization at 10° C. for 30 minutes.

Methanol was added as a polymerization terminator to the polymerization system to terminate the polymerization. The polymerization mixture was poured into a large amount of methanol containing an antioxidant, at 40° C. to coagulate a polymer. The polybutadiene thus obtained was separated by filtration and then vacuum-dried at 60° C. for 12 hours. The results of measurement are shown in Table 4.

EXAMPLES 26–28

The same procedure as in Example 23 was repeated, except that the polymerization solvent used in Example 23 was replaced by cyclohexane, n-hexane or methylene chloride. The results of measurement are shown in Table 4.

COMPARATIVE EXAMPLE 7

The same procedure as in Example 23 was repeated, except that the organoaluminum compounds used in Example 23 were replaced by triisobutylaluminum alone and the amount of water added was changed so as to give a water/triisobutylaluminum molar ratio of 1.0. The results of measurement are shown in Table 4.

It is appreciated that the replacement of the organoaluminum compounds by triisobutylaluminum alone results in a significant reduction in polymerization activity of catalyst.

TABLE 4

| | Polymerization solvent | Catalyst composition | | | | Polymer yield (%) | Vinyl content (%) | Melting point (°C.) | Number-average molecular weight ($\bar{M}n \times 10^4$) | Molecular weight distribution ($\bar{M}w/\bar{M}n$) |
| | | Butadiene/cobalt (molar ratio) | Aluminum/cobalt (atomic ratio) | MAO/Al(iBu)$_3$ (Al atomic ratio) | H$_2$O/Al(iBu)$_3$ (molar ratio) | | | | | |
|---|---|---|---|---|---|---|---|---|---|---|
| Example 23 | Toluene | 10,000 | 50 | 3 | 0.8 | 97 | 92 | 72 | 6.19 | 2.90 |
| Example 24 | " | 5,000 | 25 | 1 | 1.1 | 99 | 92 | 68 | 3.78 | 2.92 |
| Example 25 | " | 20,000 | 100 | 0.33 | 1.0 | 87 | 93 | 72 | 8.26 | 2.74 |
| Example 26 | Cyclohexane | 10,000 | 50 | 3 | 0.8 | 98 | 92 | 72 | 5.18 | 2.88 |
| Example 27 | n-Hexane | 10,000 | 50 | 3 | 0.8 | 96 | 92 | 77 | 4.24 | 2.93 |
| Example 28 | Methylene chloride | 10,000 | 50 | 3 | 0.8 | 97 | 92 | 68 | 4.76 | 2.74 |
| Comparative Example 7 | Toluene | 10,000 | 50 | — | 1.0 | 16 | 88 | 64 | 1.14 | 3.14 |

EXAMPLES 29–39

The same procedure as in Example 11 was repeated, except that the BD/Co molar ratio was changed to 30,000 and a compound as shown in Table 5 was further added as the component (D) in a proportion as shown in Table 5. The results of measurement are shown in Table 5.

EXAMPLES 40–42

The same procedure as in Example 9 was repeated, except that the triphenylphosphine used as the component (C) in Example 9 was replaced by a sulfur-containing compound [the component (E)] as shown in Table 6, in a proportion as shown in Table 6 and the Al/Co (atomic ratio) was changed to 2.5. The results of measurement are shown in Table 6.

EXAMPLES 43–48

The same procedure as in Example 11 was repeated, except that the triphenylphosphine used in Example 11 was replaced by a phosphine as shown in Table 7. The results of measurement are shown in Table 7.

EXAMPLES 49–52

The same procedure as in Example 9 was repeated, except that the triphenylphosphine used in Example 9 was replaced by the component (D) as shown in Table 7 and the BD/Co molar ratio was changed to 5,000. The results of measurement are shown in Table 7.

TABLE 5

| | Component (A) | Component (B) | Component (C) | Component (D) | BD/Co (molar ratio) | Al/Co (atomic ratio) | Component (D)/Component (A) (molar ratio) | Polymer yield (%) |
|---|---|---|---|---|---|---|---|---|
| Example 29 | Cobalt octanoate | Methylaluminoxane | Triphenylphosphine | — | 30,000 | 50 | 0.5 | 60 |
| Example 30 | Cobalt octanoate | Methylaluminoxane | Triphenylphosphine | Ethanol | 30,000 | 50 | 0.5 | 85 |
| Example 31 | Cobalt octanoate | Methylaluminoxane | Triphenylphosphine | Propanol | 30,000 | 50 | 0.5 | 86 |
| Example 32 | Cobalt octanoate | Methylaluminoxane | Triphenylphosphine | Pentanol | 30,000 | 50 | 0.5 | 84 |
| Example 33 | Cobalt octanoate | Methylaluminoxane | Triphenylphosphine | Phenol | 30,000 | 50 | 0.5 | 83 |
| Example 34 | Cobalt octanoate | Methylaluminoxane | Triphenylphosphine | 2,6-Di-tert-butyl-p-cresol | 30,000 | 50 | 0.5 | 81 |
| Example 35 | Cobalt octanoate | Methylaluminoxane | Triphenylphosphine | IRGANOX 1010* | 30,000 | 50 | 0.5 | 80 |
| Example 36 | Cobalt octanoate | Methylaluminoxane | Triphenylphosphine | Dimethyl sulfoxide | 30,000 | 50 | 0.5 | 78 |
| Example 37 | Cobalt octanoate | Methylaluminoxane | Triphenylphosphine | Pyridine | 30,000 | 50 | 0.5 | 81 |
| Example 38 | Cobalt octanoate | Methylaluminoxane | Triphenylphosphine | 2,6-Lutidine | 30,000 | 50 | 0.5 | 76 |
| Example 39 | Cobalt octanoate | Methylaluminoxane | Triphenylphosphine | Ethyl benzoate | 30,000 | 50 | 0.5 | 74 |

TABLE 5-continued

|  | Vinyl content (%) | Melting point (°C.) | $\bar{M}n \times 10^4$ | $\bar{M}w \times 10^4$ | $\bar{M}w/\bar{M}n$ |
|---|---|---|---|---|---|
| Example 29 | 93 | 104 | 17.8 | 50.2 | 2.82 |
| Example 30 | 93 | 102 | 21.5 | 57.0 | 2.65 |
| Example 31 | 94 | 114 | 19.8 | 51.3 | 2.59 |
| Example 32 | 93 | 108 | 13.8 | 37.8 | 2.74 |
| Example 33 | 93 | 98 | 14.2 | 44.0 | 3.10 |
| Example 34 | 92 | 102 | 18.5 | 54.4 | 2.94 |
| Example 35 | 93 | 101 | 21.4 | 56.7 | 2.65 |
| Example 36 | 92 | 104 | 19.8 | 61.4 | 3.10 |
| Example 37 | 92 | 109 | 24.2 | 71.6 | 2.96 |
| Example 38 | 93 | 111 | 24.6 | 68.4 | 2.78 |
| Example 39 | 93 | 109 | 16.8 | 43.5 | 2.59 |

Note:
*: Pentaerythrityl tetrakis[3-(3,5-di-tert-butyl-4-hydroxyphenyl)propionate]

TABLE 6

|  | Component (A) | Component (B) | Component (E) | Solvent | BD/Co (molar ratio) | Al/Co (atomic ratio) | Component (E)/ component (A) (molar ratio) | Polymer yield (%) | Melting point (°C.) |
|---|---|---|---|---|---|---|---|---|---|
| Example 40 | Cobalt octanoate | Methyl-aluminoxane | Carbon disulfide | Toluene | 10,000 | 100 | 2.5 | 96 | 202 |
| Example 41 | Cobalt octanoate | Methyl-aluminoxane | Diethyl-xanthogen sulfide | " | 10,000 | 100 | 2.5 | 94 | 188 |
| Example 42 | Cobalt octanoate | Methyl-aluminoxane | Phenyl isocyanide | " | 10,000 | 100 | 2.5 | 88 | 175 |

TABLE 7

|  | Component (A) | Component (B) | Component (C) | Component (D) | Solvent | BD/Co (molar ratio) | Al/Co (atomic ratio) | P/Co (atomic ratio) |
|---|---|---|---|---|---|---|---|---|
| Example 43 | Cobalt octanoate | Methylaluminoxane | Tri-(p-tolyl)-phosphine | — | n-Hexne | 10,000 | 50 | 2.5 |
| Example 44 | " | " | Tri(p-methoxy-phenyl)-phosphine | — | " | 10,000 | 50 | 2.5 |
| Example 45 | " | " | Tribenzyl-phosphine | — | " | 10,000 | 50 | 2.5 |
| Example 46 | " | " | Tricyclohexyl-phosphine | — | " | 10,000 | 50 | 2.5 |
| Example 47 | " | " | Dicyclohexyl-phenyl-phosphine | — | " | 10,000 | 50 | 2.5 |
| Example 48 | " | " | Tri-n-butyl-phosphine | — | " | 5,000 | 50 | 2.5 |
| Example 49 | " | " | — | Triethylamine | Toluene | 5,000 | 50 | — |
| Example 50 | " | " | — | Tri-n-butylamine | " | 5,000 | 50 | — |
| Example 51 | " | " | — | Pyridine | " | 5,000 | 50 | — |
| Example 52 | " | " | — | 2,6-Lutidine | " | 5,000 | 50 | — |

|  | Component (D)/ component (A) (molar ratio) | Polymerization temp. (°C.) | Polymerization time (hr) | Polymer yield (%) | Microstructure (%) | Melting point (°C.) |
|---|---|---|---|---|---|---|
| Example 43 | — | 10 | 0.5 | 80 | 89 (1,2 content) | 109 |
| Example 44 | — | 10 | 0.5 | 41 | 93 (1,2 content) | 90 |
| Example 45 | — | 10 | 0.5 | 21 | 85 (1,2 content) | Amorphous |
| Example 46 | — | 10 | 0.5 | 72 | 92 (1,2 content) | " |
| Example 47 | — | 10 | 0.5 | 94 | 92 (1,2 content) | 70 |

TABLE 7-continued

| Example 48 | — | 10 | 0.5 | 25 | 80 (1,2 content) | Amorphous |
| Example 49 | 2.5 | 10 | 0.5 | 64 | 92 (cis-1,4 content) | " |
| Example 50 | 2.5 | 10 | 0.5 | 52 | 92 (cis-1,4 content) | " |
| Example 51 | 2.5 | 10 | 0.5 | 35 | 93 (cis-1,4 content) | " |
| Example 52 | 2.5 | 10 | 0.5 | 48 | 93 (cis-1,4 content) | " |

EXAMPLE 53

In a 100-ml pressure bottle thoroughly purged with nitrogen were placed 64 g of toluene and 10 g of 1,3-butadiene, and a methylaluminoxane solution in toluene and cobalt octylate were further added thereto so that the molar ratio (BD/Co) of 1,3-butadiene and cobalt octylate became 20,000 and the atomic ratio of Al/Co became 100. The bottle was stoppered. The resulting mixture was subjected to polymerization at 10° C. for 30 minutes. Then, carbon disulfide was added in an amount equimolar to the cobalt octylate charged, and the mixture was further subjected to polymerization for 30 minutes. The termination of polymerization and the treatment after reaction were conducted in the same manner as in Example 1. The polymer obtained was subjected to extraction with cold toluene to separate into a toluene soluble portion and a toluene insoluble portion. The polymer consisted of 92% of a toluene soluble portion and 8% of a toluene insoluble portion. The toluene soluble portion was found to have 95% of a cis-1,4 content when measured for infrared absorption (IR) spectrum. The toluene insoluble portion contained a 1,2 configuration and a cis-1,4 configuration when measured for IR spectrum by KBr method; and a melting point of 200° C. when measured by DSC; this meaning that a block or graft polymer consisting of a syndiotactic 1,2 configuration and a cis-1,4 configuration was synthesized.

and a mixture of cobalt octylate and triphenylphosphine was added thereto so that the molar ratio of BD/cobalt octylate became 10,000, the atomic ratio of Al/Co became 50 and the molar ratio of triphenylphosphine/cobalt octylate became 2.5. Reaction was conducted for 1 hour, after which the polymerization mixture was transferred through the autoclave drain into a pressure container having an observation window made of a pressure glass. Upon observation of the polymerization mixture through the window, the polymer had particle diameters of 1 mm or less and was dispersed in butane in a slurry state. The results of measurement are shown in Table 8.

EXAMPLES 55–57

The same procedure as in Example 54 was repeated, except that hydrogen was allowed to be present in the system of Example 54, in an amount as shown in Table 8. Each of the polymers obtained was in a slurry state. The results of measurement are shown in Table 8.

TABLE 8

| | Component (A) | Component (B) | Component (C) | Solvent | BD/Co (molar ratio) | Al/Co (atomic ratio) | P/Co (molar ratio) | Amount of $H_2$ added (mM) | Polymer yield (%) | $\bar{M}n \times 10^4$ | $\bar{M}w \times 10^4$ | $\bar{M}w/\bar{M}n$ |
|---|---|---|---|---|---|---|---|---|---|---|---|---|
| Example 54 | Cobalt octanoate | Methylaluminoxane | Triphenylphosphine | Butane | 10,000 | 100 | 2.5 | 0 | 98 | 16.8 | 42.6 | 2.54 |
| Example 55 | Cobalt octanoate | Methylaluminoxane | Triphenylphosphine | " | 10,000 | 100 | 2.5 | 2.4 | 94 | 6.8 | 19.5 | 2.87 |
| Example 56 | Cobalt octanoate | Methylaluminoxane | Triphenylphosphine | " | 10,000 | 100 | 2.5 | 8.5 | 92 | 5.2 | 12.1 | 2.33 |
| Example 57 | Cobalt octanoate | Methylaluminoxane | Triphenylphosphine | " | 10,000 | 100 | 2.5 | 17.5 | 88 | 3.4 | 8.9 | 2.62 |

EXAMPLE 54

In a 3-liter autoclave thoroughly purged with nitrogen were placed 1,500 g of butane and 300 g of 1,3-butadiene. Then, a toluene solution of methylaluminoxane was placed therein. The polymerization system was maintained at 0° C.

EXAMPLES 58–63

The same procedure as in Example 11 was repeated, except that the methylaluminoxane was used in combination of an aluminum compound as shown in Table 9. The results of measurements are shown in Table 9.

TABLE 9

| Example No. | Aluminum compound | Aluminoxane/ aluminum compound (Al atomic ratio) | Polymer yield (%) | Microstructure of polymer (%) |
|---|---|---|---|---|
| 58 | Diethyl- aluminum chloride | 80/20 | 100 | 90 (1,2 content) |
| 59 | Diethyl- aluminum chloride | 60/40 | 100 | 91 (1,2 content) |
| 60 | Diethyl- aluminum chloride | 40/60 | 94 | 92 (1,2 content) |
| 61 | Ethylaluminum sesquichloride | 80/20 | 95 | 90 (1,2 content) |
| 62 | Ethylaluminum dichloride | 90/10 | 93 | 90 (1,2 content) |
| 63 | Trimethyl- aluminum | 80/20 | 92 | 91 (1,2 content) |

What is claimed is:

1. A process for producing a polybutadiene, which comprises polymerizing 1,3-butadiene in the presence of a catalyst consisting essentially of (A) a cobalt-phosphine complex and (B) an organoaluminum compound consisting essentially of an aluminoxane represented by formula (I) or (II):

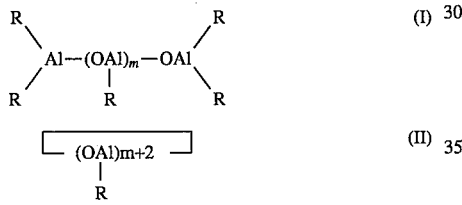

wherein R is methyl, and m is an integer of 5 to 100, in a hydrocarbon solvent.

2. The process according to claim 1, wherein the polymerization is effected in the presence of hydrogen.

3. The process according to claim 1, wherein the hydrocarbon solvent is an aliphatic hydrocarbon and the polymerization is conducted by slurry polymerization.

4. The process according to claim 1, where 1,3-butadiene is homopolymerized.

5. The process according to claim 1, wherein the cobalt-phosphine complex is cobalt bis(triphenylphosphine) dibromide, cobalt bis(triphenylphosphine) dichloride, cobalt bis-(tri-m-methylphenylphosphine) dibromide, cobalt bis(tri-m-methylphenylphosphine) dichloride, cobalt bis(tri-p-methylphenylphosphine) dibromide, cobalt bis-(tri-p-methoxyphenylphosphine) dichloride, cobalt bis(tri-p-methoxyphenylphosphine) dibromide, cobalt bis(tri-p-methoxyphenylphosphine dichloride, cobalt bis(dicyclohexylphenylphosphine) dibromide, cobalt bis(dicyclohexylphenylphosphine) dichloride, cobalt bis(tri-m-dimethylphenylphosphine) dibromide, cobalt bis(3,5-dimethyl-4-methoxyphenylphosphine) bromide or cobalt bis(3,5-dimethyl-4-methoxyphenylphosphine) chloride.

6. The process according to claim 1, wherein the cobalt-phosphine complex is cobalt bis(triphenylphosphine) dibromide.

* * * * *